(No Model.)

J. R. BARRET.

PROCESS OF PREPARING FOOD FOR ANIMALS.

No. 394,431. Patented Dec. 11, 1888.

Witnesses:
Joseph W. Roe.
John G. Pilditch.

Inventor:
J. Richard Barret
by attorney
Henry T. Brown

UNITED STATES PATENT OFFICE.

JOHN RICHARD BARRET, OF NEW YORK, N. Y., ASSIGNOR TO AUGUSTUS B. FIELD, TRUSTEE, OF SAME PLACE.

PROCESS OF PREPARING FOOD FOR ANIMALS.

SPECIFICATION forming part of Letters Patent No. 394,431, dated December 11, 1888.

Application filed July 24, 1888. Serial No. 280,861. (No model.)

*To all whom it may concern:*

Be it known that I, JOHN RICHARD BARRET, a citizen of the United States, residing in the city and county of New York, and State of New York, have invented a new and useful Improvement in the Process of Preparing Food for Domestic Animals, of which the following is a specification, reference being had to the accompanying drawings.

Experience has demonstrated that a very large portion of the cereals and other kinds of food fed in their natural state to animals produces neither growth nor fat, but passes from them in the form of excrement, and is wasted for want of more thorough mastication, digestion, and assimilation, and that there is much less waste when the food materials are ground or crushed and moistened well with water before being fed.

It has been shown by chemical analysis that animal bodies are composed of about eighty per cent. (80%) of water, and by experimental feeding I have found that water enters more readily into the composition of the animals when given to them in combination with the food; that water, having an affinity for the albuminous, mucilaginous, glutinous, and other substances of which the food materials are composed, especially for the glutinous, can be chemically united with them, and when so united, not only the water, but the other nutritious elements with which it is thus combined, are more readily and completely converted into the tissues of the animal.

The object of my invention is to so prepare cereals, grains, and other food materials for domestic animals as to render them more easily capable of digestion and assimilation, and consequently more nutritious; and to this end my invention consists in the process, hereinafter described, for the disintegration and solution or predigestion of said materials, by which these albuminous, mucilaginous, glutinous, and other nutritious elements and constituents will be liberated, dissolved, developed, minutely subdivided, and united with a large percentage of water in chemical combination, and at the same time thoroughly mixed, and so prepared as to render mastication, digestion, and assimilation easy, rapid, and as complete as possible.

To enable others to perform my process, I will proceed to particularly describe it with reference to the accompanying drawings of a digester suitable for its performance.

Figure 1:
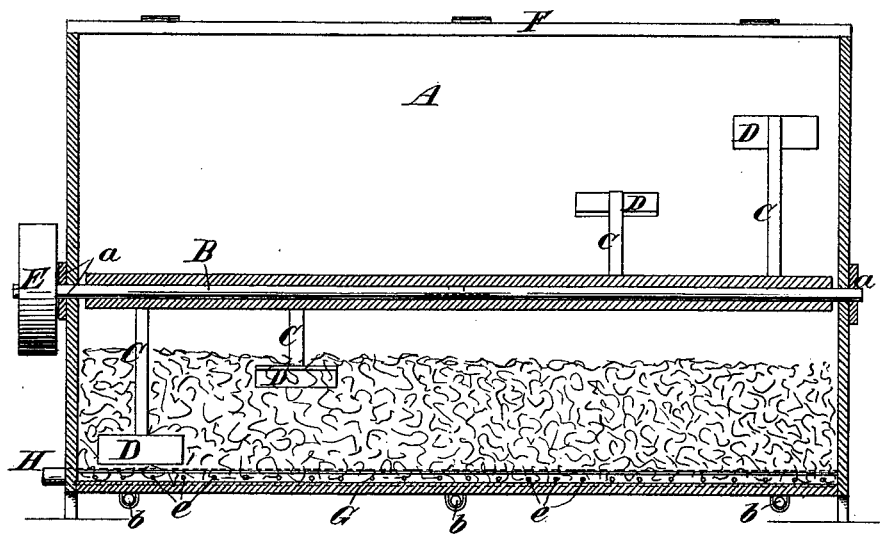
Figure 2:
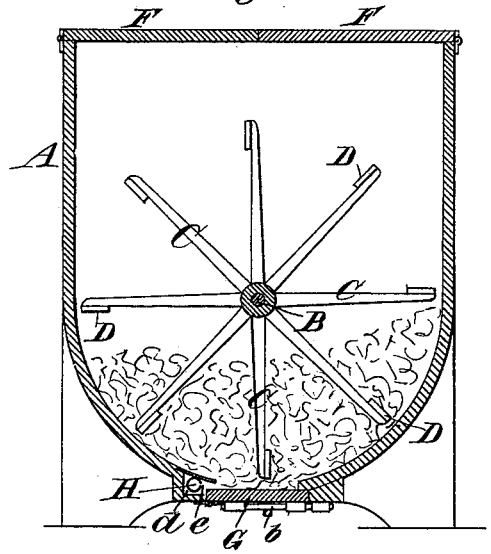

Figures 1 and 2 in said drawings represent vertical sections of the apparatus, taken at right angles to each other.

Similar letters of reference designate corresponding parts in both figures.

A designates a tightly-constructed chamber, which may be of wood, having a semi-cylindric bottom and fitted with a rotary stirring apparatus consisting of a shaft, B, with attached arms C and blades D. This shaft may be of iron, passing through the end of the box, and fitted to bearings $a\,a$, secured to the exterior thereof, and the part within the box may be covered with wood. The arms and blades may be of wood. At one end the shaft is furnished with a pulley, E, for driving it.

The top of the box is constructed as a hinged cover, F, that it may be opened for the introduction of the grain or cereals to be treated. In the middle of the bottom is a hinged trap-door, G, which is to be opened for the discharge of the food after the completion of the process of preparing it. This trap-door may, when closed during the process, be secured by any suitable means, as by strong bolts $b$.

At one side of the trap-door G a steam-pipe, H, runs the whole length of the box A. This pipe has numerous perforations throughout its length for the issue and diffusion into the contents of the box of steam supplied from any suitable source. The said pipe is placed in a covered trough, $d$, wherein it is protected, and in which are openings at $e$ for the issue of the steam into the box.

The digester described above may be of any dimensions deemed necessary; but I prefer to make the box about four feet wide, five feet high, and from six to twelve feet in length.

In carrying out my invention I open the cover F of the digester and introduce grain or a variety of grains or cereals which have been previously crushed between rollers or coarsely ground, filling the box about one-half or two-thirds full, corn, or corn and oats, being preferred, one-fifth of which having been malted; or, if brewers' grains can be had, they may be employed to the extent of three-quarters of the whole quantity of food materials introduced for treatment. I then sprinkle in the digester about a pint of salt to every ten bushels of the food materials. The cover is then closed down and steam let into the pipe H and the stirring of the food commenced by putting the shaft B in motion. The steam furnished through the pipe H into the digester is so regulated as to raise the temperature of the food materials being treated to from about 160° to 167° Fahrenheit. This temperature is maintained for about ten or fifteen minutes and then gradually raised to 212° Fahrenheit, and afterward regulated between 212° and 230°, and the steaming, together with the stirring, is continued for from one hour and a quarter to one hour and a half, when the treatment is completed, the steam shut off, and the food is discharged into a suitable receptacle through a door, G.

The food made of the materials and in the manner herein described acquires, in the process of preparation, the flavors of fresh-made bread, which is very fascinating and appetizing to animals. Horses, mules, sheep, cattle, and hogs, as well as colts, lambs, calves, and pigs, and poultry of all kinds and ages like it, eat it ravenously, and develop in growth, meat, and fat far more rapidly than when fed on any other food.

It is best, especially in cold weather, to feed it to them while it is warm, and it should be reduced with warm water to a semi-fluid condition when fed to very young quadrupeds.

The steaming of food materials for animals has been practiced to a considerable extent by farmers and stock-feeders, but with no such results as are obtained when the steam is employed in the manner herein described. The stirring and agitation by mechanical means during the application of the steam is absolutely necessary to effect the liberation and development of all the nutritive elements of the food materials and reduce them to such form and condition as will best suit the digestive functions of the animals.

The steam let into the digester through perforated pipe H is brought into contact with every portion of the food materials by the agitation produced by the arms of revolving shaft B, and not only softens and disintegrates the husks or hulls and liberates and develops the substances of which the food materials are composed, but it enters into combination with some of these constituents and increases the weight of the food treated from fifty to seventy-five per cent.

The malted grains employed in the treatment furnish to the food materials maltose or diastase, which is brought in contact with the starch elements of the unmalted grain contained in the mixture while its temperature is kept at from 160° to 170°, Fahrenheit, and dissolves the insoluble starch and converts it into dextrine, which in animal economy is an important part of the work of digestion.

What I claim as my invention, and desire to secure by Letters Patent, is—

1. The process of preparing or predigesting cereals or grain for food for domestic animals, consisting in mixing a quantity of crushed or ground unmalted grain or cereals with a quantity of grain which has been malted, and subjecting the mixture while it is stirred to the action of steam so regulated as to bring the temperature of the mass gradually to about from 160° to 167° Fahrenheit, and to maintain it at that temperature for a time to allow the diastase of the malted grain to dissolve the starch of the unmalted grain, and finally to raise its temperature to from 212° to 230° Fahrenheit, to complete the predigestion, substantially as herein set forth.

2. The process of preparing food for animals, consisting in taking crushed or ground unmalted grain, mixing with the same a quantity of malted grain, placing the mixture in a closed vessel, subjecting the same to the action of steam until the temperature of the mass is raised to from about 160° to 167° Fahrenheit, maintaining the same at such temperature for, say, ten to fifteen minutes, next gradually raising the temperature to about 212° to 230° Fahrenheit, and maintaining the same during stirring at such temperature for from, say, one and a fourth to one and a half hour, substantially as specified.

J. RICHD. BARRET.

Witnesses:
FREDK. HAYNES,
HENRY J. MCBRIDE.